United States Patent [19]

Has

[11] Patent Number: 5,777,404
[45] Date of Patent: Jul. 7, 1998

[54] ROTATING ACTUATOR

[76] Inventor: Peter Victor Has, Veldmaterstraat 194, NL-7481 AE Haaksbergen, Netherlands

[21] Appl. No.: 836,218

[22] PCT Filed: Nov. 7, 1995

[86] PCT No.: PCT/NL95/00383

§ 371 Date: Jul. 14, 1997

§ 102(e) Date: Jul. 14, 1997

[87] PCT Pub. No.: WO96/16463

PCT Pub. Date: May 30, 1996

[30] Foreign Application Priority Data

Nov. 7, 1994 [EP] European Pat. Off. ............ 94203245

[51] Int. Cl.$^6$ ........................ H02K 33/02; H02K 41/00
[52] U.S. Cl. ........................ 310/12; 310/17; 310/20
[58] Field of Search ........................ 310/12, 17, 20; 335/248, 257, 277

[56] References Cited

FOREIGN PATENT DOCUMENTS

| 0 107 881 | 5/1984 | European Pat. Off. . |
| 2 025 138 | 1/1980 | United Kingdom . |

*Primary Examiner*—Steven L. Stephan
*Assistant Examiner*—Judson H. Jones
*Attorney, Agent, or Firm*—Webb Ziesenheim Bruening Logsdon Orkin & Hanson, P.C.

[57] ABSTRACT

A rotating actuator displaces a movable pin between two end positions, at least one of which two end positions is a stop. The actuator comprises an energy buffer, components mutually connecting the energy buffer and the movable pin, a mass capable of storing energy of the energy buffer as kinetic energy, wherein at the end of the displacement in at least one direction the kinetic energy of the mass is stored again in an energy buffer. A locking device blocks the actuator in at least one extreme position when the remaining kinetic energy has been substantially transferred to the energy buffer. The lost energy can be supplied at the end of the movement cycle. Between the energy buffer and the movable pin are situated at least two rotating components, i.e., an actuating element which drives the movable pin between two end positions. The distance between the end positions in relation to each other is not necessarily determined. A mass which moves along partly parallel with the actuating element, wherein kinetic energy is stored in the mass at the beginning and over only a part of the movement, on the basis of which kinetic energy the movement of the rotating components can be completed without other energy sources having to be applied for this purpose and whereof at the end of the movement the mass can rotate further relative to the actuating element, wherein the remaining kinetic energy of the mass is relinquished to the energy buffer.

18 Claims, 7 Drawing Sheets

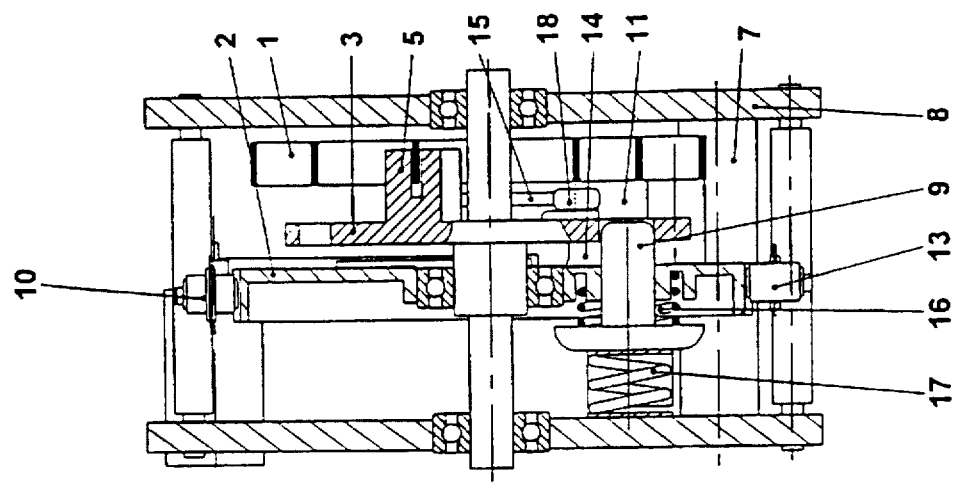
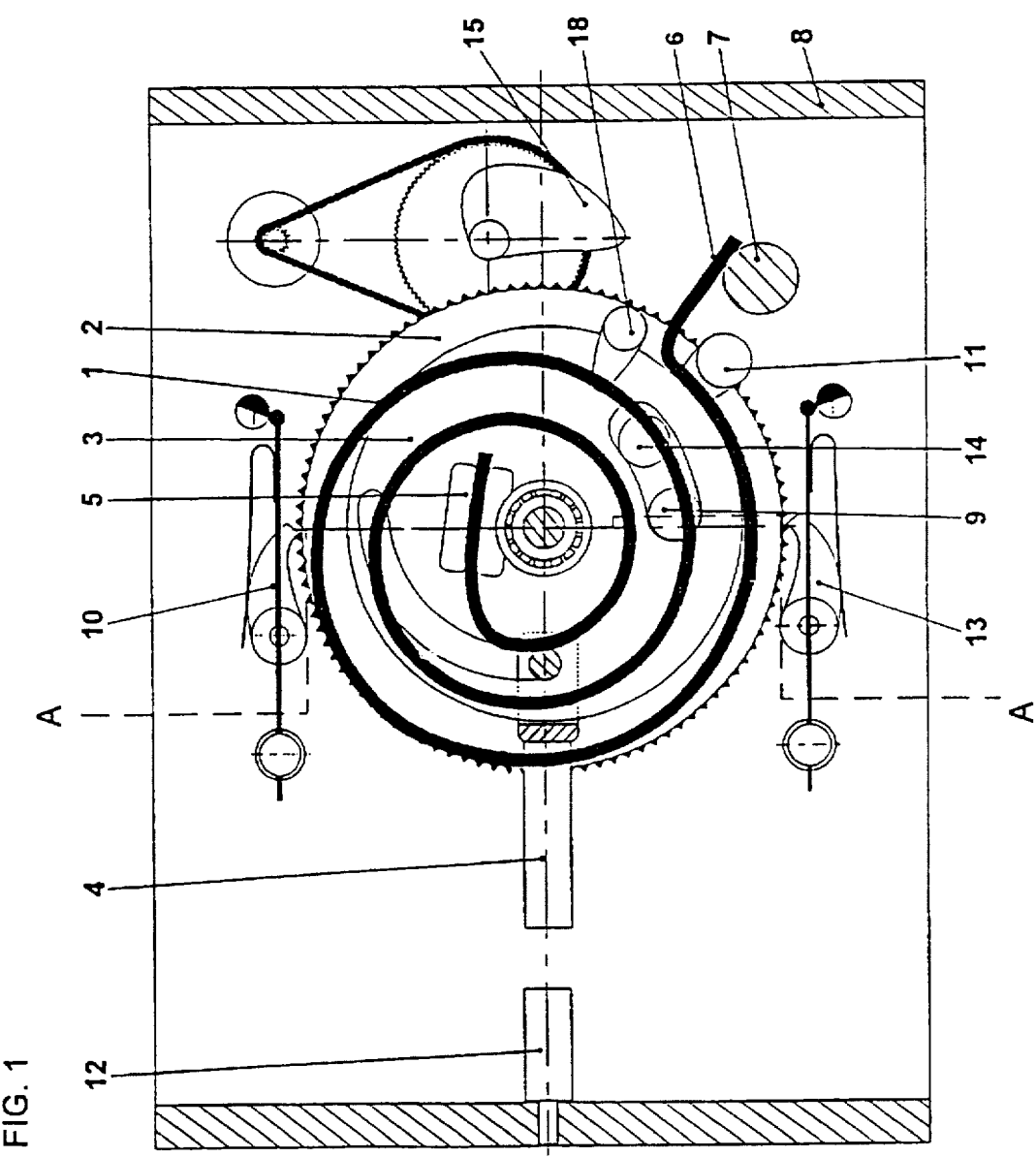
FIG. 2 A-A
FIG. 1

ROTATING ACTUATOR

BACKGROUND OF THE INVENTION

1) Field of the Invention

The invention relates to an actuator for displacing a movable pin between two end positions, at least one of which two end positions is a stop, comprising an energy buffer, components mutually connecting the energy buffer and the movable pin, a mass capable of storing energy of the energy buffer as kinetic energy, wherein at the end of the displacement in at least one direction the kinetic energy of the mass is stored again in an energy buffer, locking means which block the actuator in at least one extreme position when the remaining kinetic energy has been wholly or almost wholly generated to the energy buffer, and means with which at the end of the movement cycle the lost energy can be supplied to for instance a locking, switch or press or hammer device for instance for compacting, deforming, reinforcing and/or ejecting material.

2) Background Information

Such an actuator is known for instance from EP-B-0 107 881.

An object of the invention is to arrive at an inexpensive and compact actuator which, irrespective of the direction of the gravitational force and irrespective of the presence of external energy sources such as a mains electricity supply or for instance an external accumulator battery, is capable of actuating the movable pin time and again in the correct manner and of realizing the required pressure between movable pin and the stop.

The invention furthermore has for its object to be used for the purpose of rotating as well as non-rotating pins.

The invention moreover has for its object to be used on actuators wherein the distance between the two end positions is not fixed precisely as a consequence of wear or inaccurate production processes or because the stop is not defined at all due to the nature of the application, for instance the use for machining material wherein the actuator forms part of an apparatus which is held at an imprecise distance from the material for working.

SUMMARY OF THE INVENTION

These objectives are generally realized by an actuator which has the feature that between the energy buffer and the movable pin are situated at least two rotating components, i.e. an actuating element which drives the movable pin between two end positions, whereof the distance between the end positions in relation to each other is not necessarily determined, and a mass which moves along partly parallel with the actuating element, wherein kinetic energy is stored in the mass at the beginning and over only a part of the movement, on the basis of which kinetic energy the movement of the rotating components can be completed without other energy sources having to be applied for this purpose, and whereof at the end of the movement the mass can rotate further relative to the actuating element, wherein the remaining kinetic energy of the mass is relinquished to the energy buffer.

The device comprises an actuator which displaces one (or more) pin(s) which may or may not be rotatably movable and which must be moved through a certain, not necessarily defined, distance or angle from the one end position to the other and back again, wherein at least one end position is characterized by a stop, wherein the pin is held fixedly in both or in one of the end positions by the locking forming part of the actuator and can be released again as required, wherein in at least one of the two end positions the pin exerts a certain pressure on its stop, and wherein the actuator also contains energy means which store the energy in the form of potential energy in at least one of the end positions, wherein potential energy is generated to the actuator during only a part of the displacement, wherein potential energy is converted into kinetic energy which is in turn stored in the mass forming part of the actuator, wherein at the end of the movement the remaining kinetic energy is again converted into potential energy and vice versa, and wherein the device also comprises means for energy supply which at the end of the movement are able to supply the lost energy in the form of potential energy to the energy buffer, wherein it is possible to cause the speeds of the movable pin to be largely independent of the gravitational force and wherein with comparatively simple locking means a precise locking of the pin is possible as close as possible to the point where all kinetic energy is stored as potential energy.

The invention is based on a favourable energy management and compact construction, whereby using known and compact forms of energy storage in the actuator or as component of the device of which the actuator device forms part, independently operating machines can be made.

For this purpose it makes use of one or more energy buffers in which potential energy is stored and which, after they have relinquished their energy in the form of kinetic energy for displacement of the movable pin with associated parts, also gradually store again the remaining kinetic energy at the end of the movement.

The thus realized small energy losses results in the use of lighter components for acceleration, whereby the total required energy content can be smaller, which itself again results in smaller losses etc. This principle also has the advantage that braking of the parts takes place gradually, whereby no sudden large collision forces occur whereby constructions can be made lighter. Lighter masses moreover result in per se smaller forces, whereby constructions can again be made lighter, which again also results in lighter masses. Furthermore, when energy losses are small, they can easily be supplemented from compact and relatively cheap forms of energy storage which form part of the actuator or device of which the actuator forms part, whereby the object of the invention is fulfilled.

The invention is based inter alia on the application of rotating masses and components, whereby the influence of the direction of the gravitational force for the relevant rotating parts is eliminated and with which in very simple manner rotating pins can likewise be operated.

The invention is likewise based on a construction such that locking can take place accurately and effectively with simple locking means, whereby the actuator can be produced more simply and therefore inexpensively while at least retaining a good energy efficiency.

Attention is drawn to the patents U.S. Pat. No. 3,248,497, U.S. Pat. No. 1,872,382, U.S. Pat. No. 3,811,022, FR-A-2 092 316 and CH-A-347 244.

These patents relate to a switch wherein a contact pin is moved against a stop and wherein in order to build up contact force or to prevent contact bouncing or to prevent undesired vibrations, spring and/or spring damping constructions are used parallel to or between the actuator and the contact pin. The energy stored in these spring configurations during switch-on becomes available again in these cases for the greater part or for only a small part at switch-off. In none of these inventions however is there a process wherein potential energy is first converted into kinetic energy for the purpose of the movement, wherein the movement is completed only, or practically only, on the basis of the kinetic energy and where at the end of the movement the remaining kinetic energy is again stored as potential energy, which energy wholly or largely provides the return movement.

The drawback to all these actuators is that they do not fulfill the intended objective in respect of favourable energy management, simplicity, compactness and the independence of the direction of the gravitational force.

The properties of such an actuator are described in EP-B-0 107 881. This actuator is used to displace a movable element between two end positions.

This actuator consists of a linearly moving mass which is directly coupled to a movable pin which moves between two end positions and which is operated by a cylindrical spiral spring which is incorporated in the mass and which first slackens over a certain distance, therein accelerating the movable pin and the mass, whereby potential energy of the spring is converted into kinetic energy of the mass. For this purpose the spring supports on one side on the movable pin and on the other side against a stop which forms part of the housing of the actuator and for this purpose penetrates into the mass in order to be able to reach the spring end.

At the end of the stroke wherein potential energy is converted into kinetic energy, the assembly of mass, pin and spring moves further, whereby the desired distance is spanned on the basis of the built-up kinetic energy and without further addition of energy until the movable pin reaches the stop, whereafter the mass, due to its kinetic energy, is capable of running on through a certain distance, therein slightly tensioning the spring again.

This actuator likewise contains locking means which lock the mass in or close to the extreme positions, wherein the degree to which the locking means are successful in locking the mass when the kinetic energy is zero is a measure for the degree to which the energy conversion process is effective.

All the proposed actuators, including the intended invention, are based inter alia on the principle of energy conversion, wherein potential energy for the purpose of a displacement is converted into kinetic energy and vice versa as soon as the movement is completed. This principle is known from physics and is much used in actuators in different forms, for instance in the form of a pendulum principle, either modified or not, such as is also found in clock mechanisms.

The drawback to the apparatus described in EP-B-0 107 881 lies among other things in the co-action between the mass and the possible locking means. Particularly where this is applied for actuating moving pins wherein the actuating mass only runs on over a small distance, as a result for instance of the desired small energy content and the use of springs with a high spring constant in combination with a high biased force of the spring with the object of keeping the actuator compact and also to be able to provide the desired force between moving pin and stop, such as is desired for instance in the case of switch contacts.

It will in any case be found in practice to be impossible or very difficult to make a locking means which receives and locks the mass precisely when it becomes stationary, which is therefore when all kinetic energy is stored in the spring. Account will always have to taken that this takes place a certain distance too early or too late. Because this distance is determined by the quality of the locking and does not depend on the distance over which the mass runs on after the movable pin has reached one of its end positions, it will be apparent that when the actuating mass runs on over a small distance the energy losses are relatively greater than in the case of a large distance.

In practice therefore it will be necessary for the purpose of locking the linear mass either to apply particularly complex and expensive locks which engage very precisely, or to connect to the mass an extra mass which acquires a greater stroke by means of a conversion mechanism and on which relatively simple locking means can already engage efficiently, which is in itself a significant complication of the actuator and moreover results in all kinds of undesired adaptations between the two mutually connected masses.

Another drawback to the actuator as described in EP-B-0 107 881 is that the speed of the movable pin is influenced by the position which it occupies in relation to the gravitational force. Whether the gravitational force assists or hinders the actuating linear mass will have a great influence on the speed of the movable pin. This is all the more of a drawback since reducing the size of the mass, whereby the sensitivity to the gravitational force decreases, is not possible in combination with a higher speed, so that the energy product remains the same, as the mass is directly coupled to the movable pin and the speed of the movable pin is usually prescribed.

The dependence on the direction of the gravitational force will entail a significant obstacle to use if the actuator is used for instance for a modular device which it must be possible to place or use in different systems and in different, still unknown positions relative to the gravitational force.

Another drawback to the said actuator is that the outward speed of the movable pin, thus immediately after slackening of the spring, is always higher than during the second cycle when the movable pin returns to its original position. The energy loss which will inevitably occur during the outward movement will anyway result automatically in a lower return speed.

This is an important drawback in the case the actuator is used to displace for instance the movable contact pin of switches, wherein the energy buffer is charged in switched-off position and wherein the switch-on speed may be lower than the switch-off speed. If this option of a lower switch-on speed is not utilized, the average speed then becomes higher and thereby the amount of energy which is involved and thus also lost. Unnecessarily high speeds moreover result in greater forces, whereby heavier components are required, which in turn results in greater amounts of energy etc.

Another disadvantage of the said actuator is that the direct coupling of the mass to the movable pin allows no other than a direct and linear movement relation between mass and movable pin. Adapting of the speeds, for instance just prior to the moment of contact between the movable pin and the stop in order thereby for instance to reduce the degree of collision, is thereby not possible.

Another drawback of the said device is that it is wholly based on actuation of a movable pin for linear displacement.

Due to these drawbacks this device also does not comply with the different points stated as the objective.

The invention has for its object to largely obviate all the above stated objections while retaining the obtained advantages and properties, whereby the objective is achieved to the fullest possible extent.

In the preferred embodiment the actuator consists of:

A rotating actuating element or an assembly of actuating elements to which the rotating pin or, via a converting mechanism the non-rotating, for instance linearly moving pin, is fixed and which displace the pin between two end positions, wherein at least one end position is defined by a stop.

A spring or an assembly of springs which is fixed to the ends between the actuating element and the frame or housing of the actuator and which in tensioned state has available sufficient energy to displace the pin in outward and return direction, wherein the spring drives the actuator over only a part of the angular displacement.

and which is also capable to provide the required pressure with which the pin must be pressed against the stop.

A rotating flywheel or an assembly of flywheels of which the axis of rotation does not have to coincide with that of the actuating element, which co-rotates with the actuating element and which is capable of storing potential energy from the spring as kinetic energy, so that this can keep going the movement of the actuating element at the moment the spring ceases to generate energy, wherein at the end of the movement the flywheel moreover gives back the remaining kinetic energy to the spring which is thereby able to build up the desired force with which the pin must be pressed against the stop.

One or more stops between actuating element and flywheel which provides the coupling between the two in one actuating device such that the component actuated by the spring is able to carry the other component therewith in its rotation.

One or more locking devices for one or both end points which engage on the flywheel and which are capable of leaving the flywheel in free rotation during conversion of remaining kinetic energy into potential energy in the spring, and of automatically blocking the flywheel at the moment that, under the influence of the force of the spring, the flywheel reverses its direction of rotation. The locks are also provided with unblocking means which release the flywheel at the moment this is desired.

A spring tensioning device which supplements the lost energy in the spring at the end of the movement cycle.

A frame or housing to which the stops and rotation points of the device are fixed.

As drive force for the actuator use is made of a spring, but the force can equally be derived from a system of springs or from another form of energy storage, provided that this has sufficient power available to provide the movable pin with the correct movement conditions.

In the case the actuator is used for actuating a non-rotating, for instance linearly moving pin, the conversion from the rotating to the non-rotating movement can then take place in any usual manner. Not important herein is the manner in which the axes of one or both rotating main parts are placed relative to the movable pin.

The flywheel can consist of a number of flywheels which, on the basis of the preferred embodiment, are placed between, adjacently of or on either side of the actuating element.

The actuating element which contains the rotating pin or to which the non-rotating movable pin is fixed is driven by the spring over only a part of its stroke, wherein it carries the flywheel along in its movement by means of for instance a stop.

At the end of this stroke the flywheel takes over the supporting point of the spring on the frame by means of a stop, whereafter the spring is enclosed between actuating element and flywheel without being able to slacken further. The flywheel and the actuating element now carry the spring along in their movement until the movable pin, and therewith the actuating element, come to a standstill against the stop. The flywheel is now able to run on relative to the actuating element counter to the spring pressure, whereby it gradually brakes, wherein kinetic energy is stored in the spring until the flywheel comes to a standstill, whereupon the locking blocks the flywheel in this extreme position.

The energy which is thus stored in the spring is the energy with which the return movement must be realized which, as a result of the inevitable energy losses, will of course thereby be performed at a lower speed than the outward movement.

The spring which is locked in this position between the flywheel and the actuating element will slacken as soon as the locking once again releases the flywheel. The spring now actuates the flywheel until it encounters and carries along in its movement the stop or the supporting point of the actuating element. The spring then remains enclosed between the flywheel and the actuating element, but now in biased position.

In order to return to the original position at a higher speed, the coupling between the flywheel and the actuating element consists of two stops or of one stop with a number of contact points.

These different contact points lie one after another as seen in the direction of movement and thereby result in different positions of the flywheel and the actuating element relative to each other and signify different energy contents for the spring enclosed between the flywheel and the actuating element.

Since the pressure on the contact point between actuating element and flywheel falls away during the outward movement, after the actuating element has come to a standstill and the flywheel continues further this contact point can be displaced in simple manner, for instance by a spring, such that the second supporting point lying thereafter becomes available for the return movement. This second supporting point has the property that it allows a larger angle of relief of the flywheel relative to the actuating element. The spring can thereby generate more energy to the flywheel than the flywheel has stored in the spring during the outward movement, which will immediately result in higher speeds during the return movement.

Without being driven the assembly of rotating parts and the spring now continue further due to spring force until the spring end not connected to the actuating element again encounters its original supporting point of the frame or housing of the actuator. At that moment this supporting point on the frame will replace the supporting point on the flywheel.

The flywheel now rotates further under the influence of its own kinetic energy, therein pushing the actuating element before it by means of the stop, whereby the spring is tensioned, until all kinetic energy is converted into potential energy and the flywheel will come to a standstill, whereafter locking means engage on the flywheel, thereby locking the flywheel and the actuating element in their extreme position.

A spring tensioning device can subsequently begin to tension the spring until the original position is assumed. It will do this for instance by causing a curve path to act on a point of the actuating element so that the actuating element moves further counter to the spring pressure, therein tensioning the spring, wherein it is not important, within limits, where the actuating element has come to a standstill. Other methods of supplying energy are also conceivable however, such as manually, magnetically, pneumatically etc.

During spring tensioning the retracted first stop or contact point will be able to resume the original position due to the presence at that location of for instance a resilient stop which, counter to the resetting force of the spring of the first stop, pushes this back to the original position.

At the end of the spring tensioning path the actuating element will moreover carry along the flywheel by means of a stop appropriate for this purpose so that the actuating element is carried back together with the flywheel into the original starting position. Due to its directional sensitivity the locking will allow this tensioning movement.

At the end of the spring tensioning path the spring is tensioned, the curve disappears from the path of the actuating element, whereby under the influence of the spring force this latter will come to lie against the first stop between actuating element and flywheel, which has meanwhile returned fully to the original position.

The locking now also blocks the actuating element via flywheel and stop, wherein the stop is once again fixed for the outward movement by the contact pressure.

Another conceivable embodiment is one wherein the spring is sub-divided into two springs, wherein the function of accelerating the rotating parts of the actuator is provided by a second spring which does not form part of the rotating parts but which is fixedly mounted with its one outer end to the frame and with its other outer end co-acts with the actuating element such that in the starting position the spring, whereof the stroke over which it can slacken is limited, drives the actuating element through an angle which corresponds with this limited stroke, which element then moves further together with the flywheel. The first spring which forms part of the assembly of rotating parts has the same function and therefore also property as described above but without providing the kinetic energy for the outward movement.

Equally conceivable is another embodiment wherein the second spring is used to provide additional energy for the purpose of the return movement, wherein it is also able to store kinetic energy. For this purpose this spring is fixed with the one outer end to the frame and at the end of the outward movement of the actuating element the flywheel encounters the other end of the spring, therein generating energy stored in the spring.

Also conceivable is the embodiment which is a combination of the above described embodiments, wherein use is thus made of two springs which do not form part of the assembly of rotating parts and wherein the one spring provides energy for the outward movement and the other spring for the return movement. This embodiment can exist with or without the original spring forming part of the assembly of rotating parts.

Use of one or more flywheels, wherein the mass is distributed uniformly relative to its axis of rotation, results in the direction of the gravitational force having no effect on the speeds.

Basing the actuator on the application of the principle that potential energy is converted into kinetic energy and vice versa achieves that very little energy will be required to perform the movement, whereby light and inexpensive construction is possible.

By using a flywheel as mass and by causing the locking means to engage on or close to the outside of the flywheel, a significant increase in the displacement on its outside can be realized in very simple manner by selecting a sufficiently large diameter, whereby the engagement of locking means with the inevitable rearward displacement of the mass as a result of plays, elasticities and inaccuracies results in only a very small angular displacement and thus little energy loss. The actuator thereby remains simple and inexpensive while retaining a large degree of efficiency.

By using a rotating actuating element both non-rotating and rotating pins can be actuated in simple manner.

BRIEF DESCRIPTION OF THE DRAWINGS

The invention will be elucidated with reference to the embodiments shown in the schematic figures.

A possible production embodiment, with several variants thereof, will be described with reference to the following drawings.

FIGS. 1–2 show the actuator, wherein a linearly moving pin is actuated. In the drawn position the actuator is ready to actuate the pin.

DESCRIPTION OF THE PREFERRED EMBODIMENTS

Figure 3:
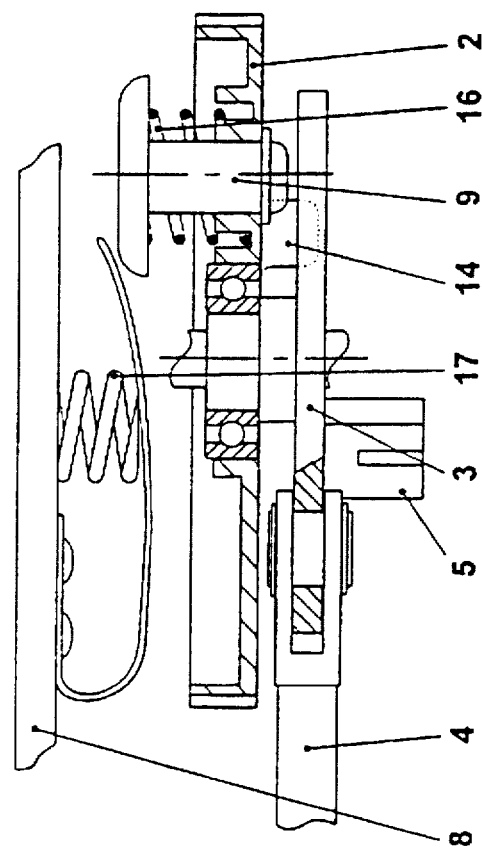
FIGS. 3–4 show details of the actuator in respect of the resetting of the connecting stop between flywheel and actuating element, in addition to the manner of connecting the vertically moving pin and the actuating element.
Figure 4:
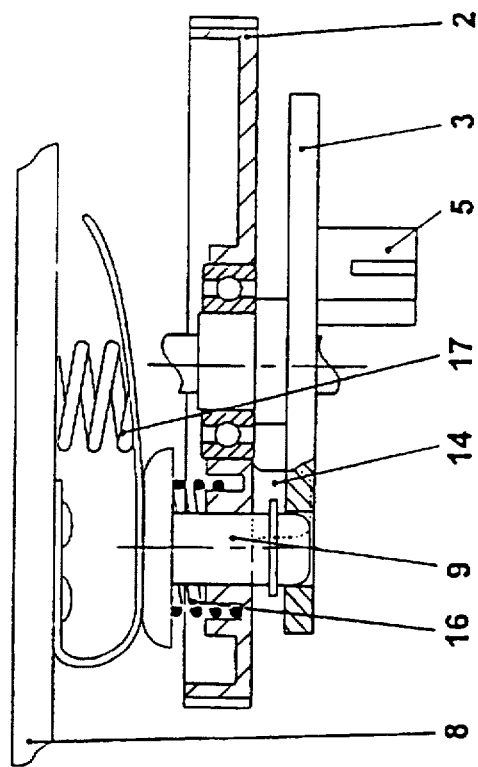
Figure 5:
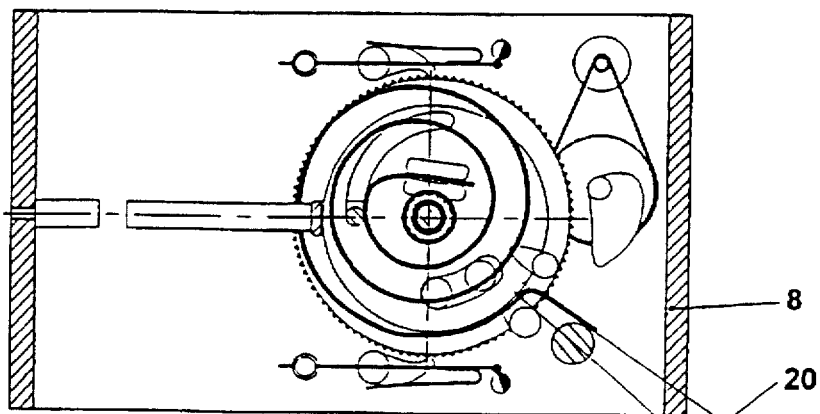
FIGS. 5–8 show the different positions of the outward movement.
Figure 6:
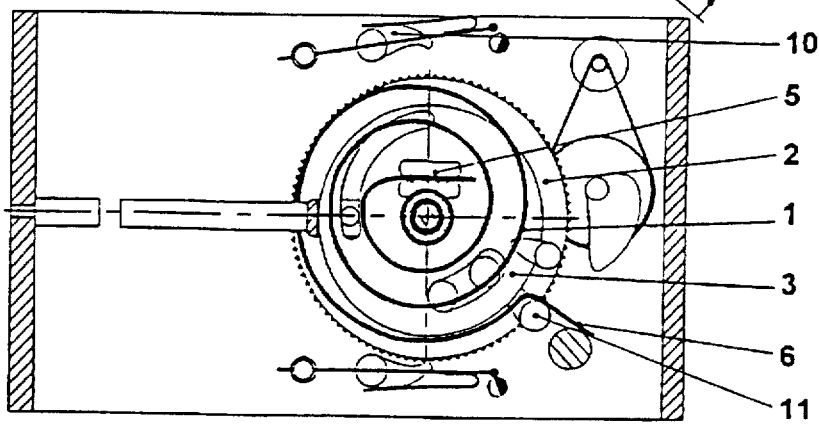

The operation will be elucidated with reference to FIGS. 1–20. Insofar as appropriate, corresponding components are always designated with the same reference numerals.

The spring 1, which is tensioned in the starting position, in this case of the opened position of the movable pin 4, is situated adjacently of or between one or more flywheels 2 and the actuating element 3 of the movable pin 4. The spring is fixed with one outer end to actuating element 3. The other spring end 6 supports against the stop 7 of frame 8. The actuating element 3 supports against stop 9 of flywheel 2. The locking 10 which engages on flywheel 2 prevents slackening of the spring 1 (see FIGS. 1 and 2).

The release of the flywheels 2 by the locking 10, for instance by an electric coil (not shown), sets the flywheel 2 and actuating element 3 into movement through a defined free angle 20. Sufficient kinetic energy is herein stored in flywheel 2 for both the outward and the return movement. At the end of the free angle 20 the stop 11 of flywheel 2 strikes the spring end 6 and subsequently carries it along in its movement. The spring 1 is then enclosed between the stop 11 of flywheel 2 and the mounting 5 of actuating element 3 and generates no further energy (see FIGS. 5–6).

In free movement the assembly of flywheel 2, spring 1, actuating element 3 and movable pin 4 moves to the stop 12.

Figure 7:
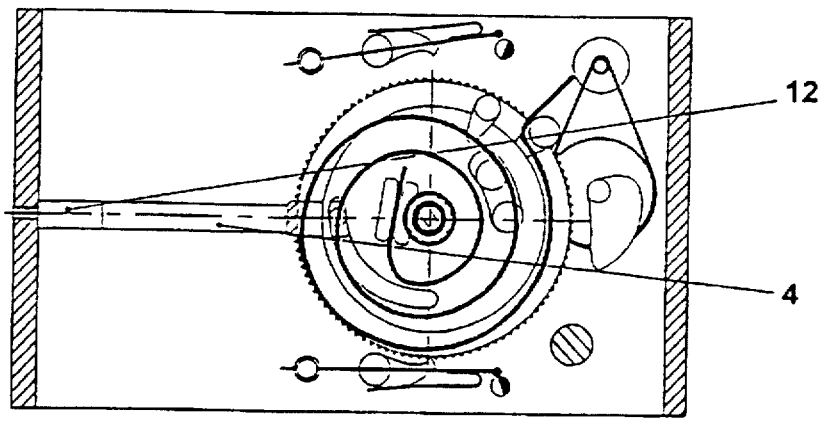
Figure 8:
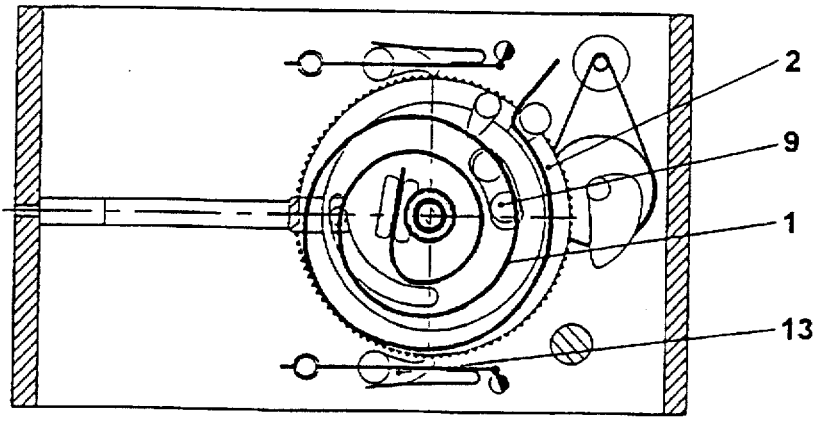
Figure 9:
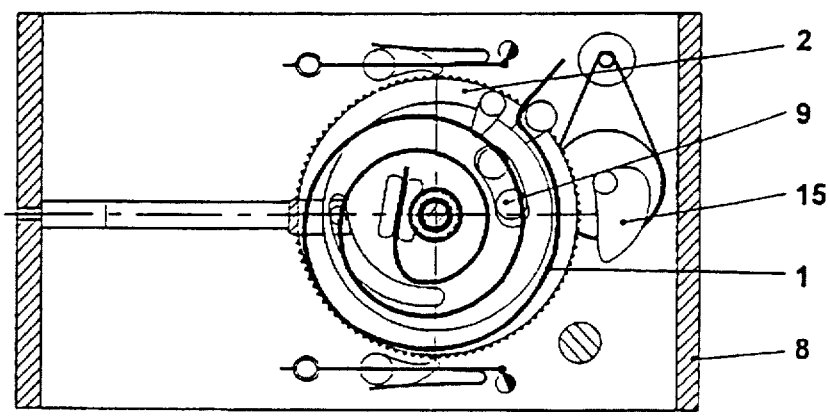
FIGS. 9–12 show the different positions of the return movement.
Figure 10:
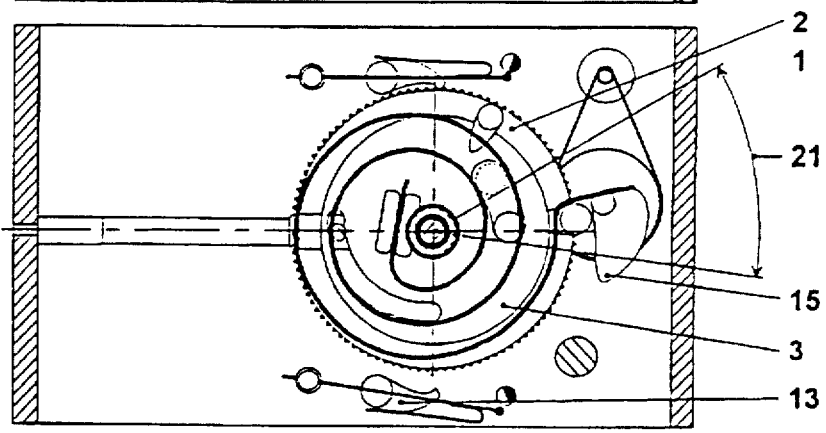
Figure 11:
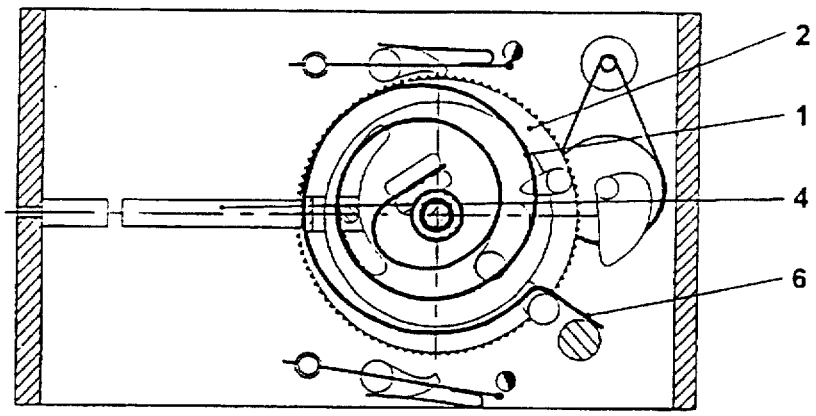
Figure 12:
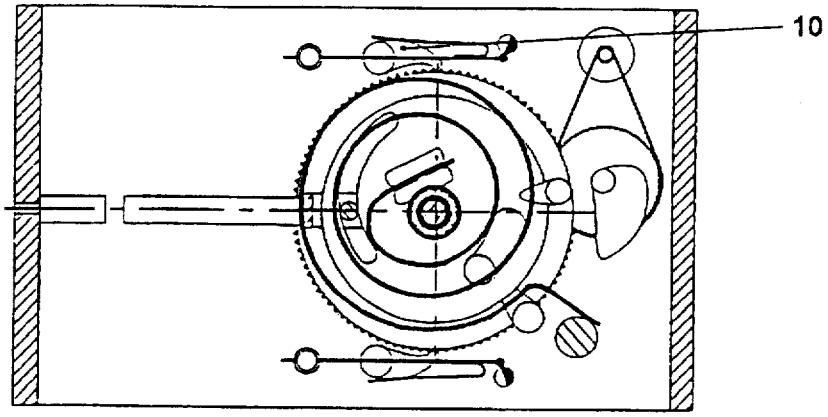
Figure 13:
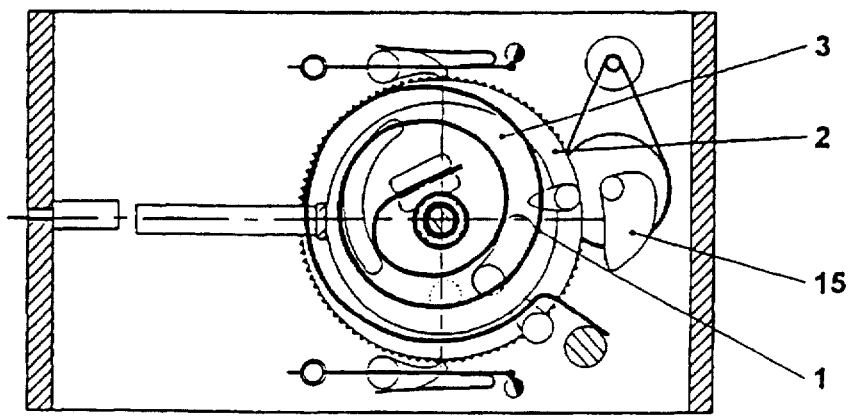
FIGS. 13–16 show the different positions of the movement during charging with energy.
Figure 14:
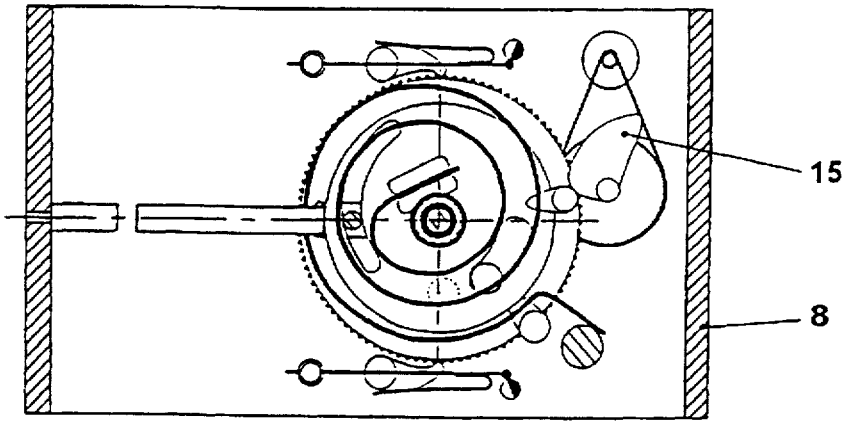
Figure 15:
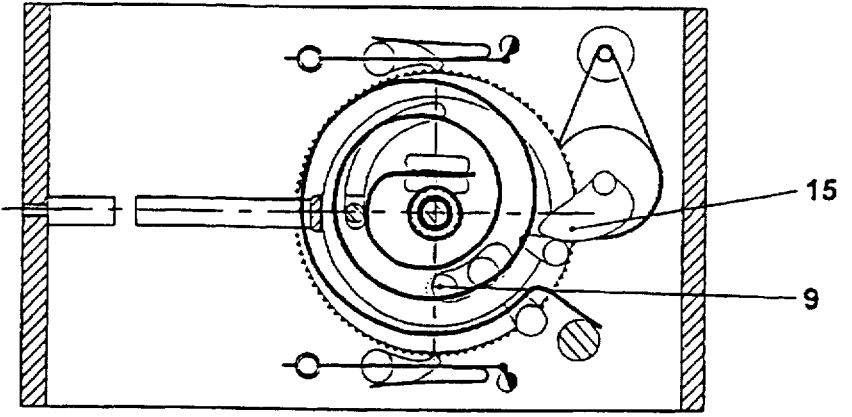
Figure 16:
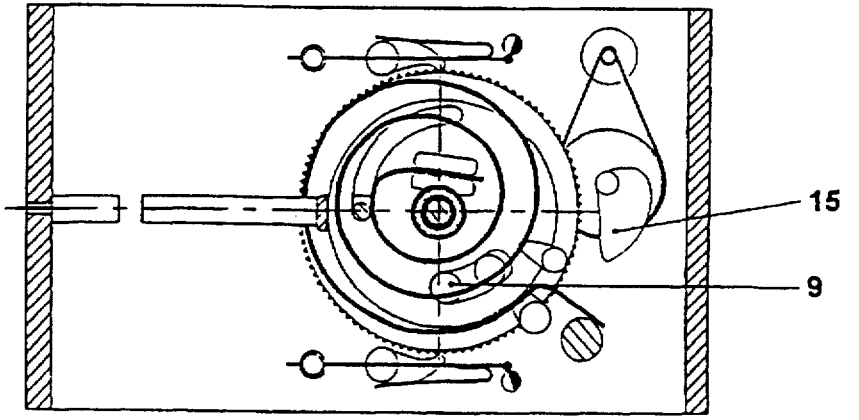
Figure 17:
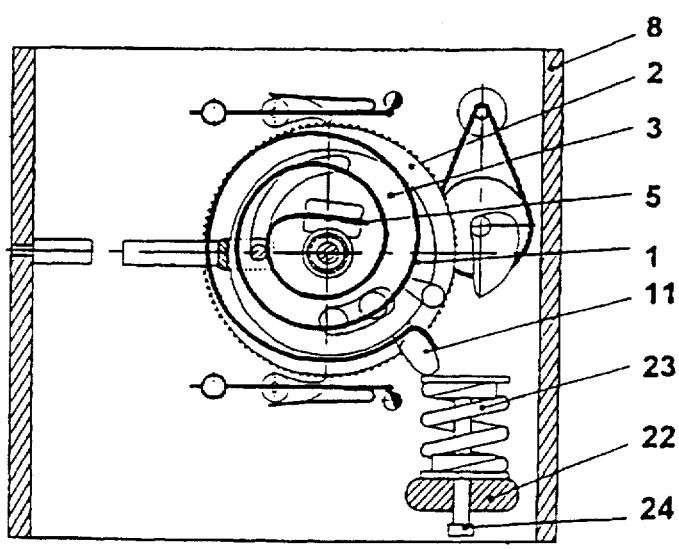
FIG. 17 shows the actuator, wherein the central actuating spring is used for the return movement and an additional spring is used for the outward movement.

Having arrived there, the movable pin 4 and the actuating element 3 connected thereto stop (see FIG. 7).

The flywheel 2 can now rotate further counter to the spring pressure, wherein the contact with stop 9 is lost, whereby kinetic energy from the flywheel 2 is stored in spring 1. Once the kinetic energy is fully converted, whereby under the influence of the spring force of spring 1 the flywheel 2 will want to initiate a reverse movement, the locking device 13 will then block flywheel 2 (see FIG. 8).

During the outward movement, immediately after the movable pin 4 makes contact with stop 12, the stop 9 on flywheel 2 is relieved by running on of flywheel 2. Under the influence of for instance a spring 16 the stop 9 shoots aside out of the path of the actuating element 3 (see FIGS. 3–4). The next stop in the path of actuating element 3 is now stop 14. For the return movement the spring 1 can thus slacken over a greater angle 21 than during the outward movement, whereby a higher speed is realized (see FIGS. 9–10).

For the return movement the locking 13 is released in a manner analogous to that during outward movement. The released spring 1 slackens over the now enlarged angle 21 wherein flywheel 2 is accelerated without the actuating element 3 being carried along in the movement. The stop 14 of flywheel 2 subsequently strikes against the end of its path and thereby against actuating element 3 (see FIG. 7).

The spring 1 does not now slacken further, whereupon flywheel 2, spring 1 and actuating element 3 with the movable pin 4 coupled thereto are carried along in the return movement without the spring 1 generating further energy. At the end of the rotation the outer end 6 of spring 1 comes to a standstill against the stop 7 of frame 8 (see FIG. 11).

Under the influence of the remaining kinetic energy the flywheel 1 rotates further counter to the spring force until all the kinetic energy is converted into energy of the spring 1, wherein the spring is gradually tensioned. The flywheel 2 stops and is locked against direction reversal by the locking device 10 (see FIG. 9).

Once the flywheel 3 has come to a stop and is locked, the lost energy is then supplemented by a spring tensioning device 15 by returning actuating element 3 to the original position counter to the spring tension of spring 1, wherein the stop 9 can return to its original position under the influence of a resetting spring 19 of frame 8 (see FIGS. 3, 4, 13, 14, 15, 16).

A second embodiment relates to the actuator which is provided with an additional spring 23 for the outward movement. The spring 1 can herein relinquish energy to the actuator as described above, therein supported by the additional spring 23, but can also be applied such that spring 23 generates all energy for the outward movement. In this embodiment (see FIG. 17), in the position preceding the outward movement the central spring 1 is mounted with the outer end 5 with actuating element 3, while the other outer end supports on stop 11 of flywheel 2. The energy for the outward movement comes from the additional spring 23 which in this position is enclosed between the stop 22 of the frame and the cam 11 of flywheel 2. The spring 23 is released by the locking 10, whereafter the additional spring 23 can relinquish energy to the flywheel until it is bounded by stop 24, whereafter as described above the assembly of flywheel 2 and actuating element 3 completes the outward movement in free motion. In this embodiment the return movement takes place as described above (see FIG. 17).

Figure 18:
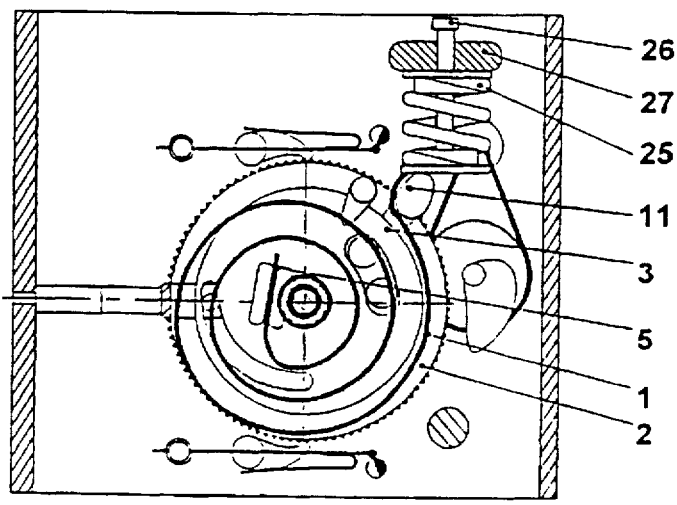
FIG. 18 shows the actuator, wherein the central actuating spring is used for the outward movement and an additional spring is used for the return movement.

A third embodiment relates to the actuator provided with an additional spring 25, the stop 27 of frame 8 and the stop 26 which bounds the stroke of spring 25, wherein this spring generates energy to the actuator for the purpose of the return movement in a manner comparable to that of the additional spring 23 for the purpose of the outward movement (see FIG. 18).

Figure 19:
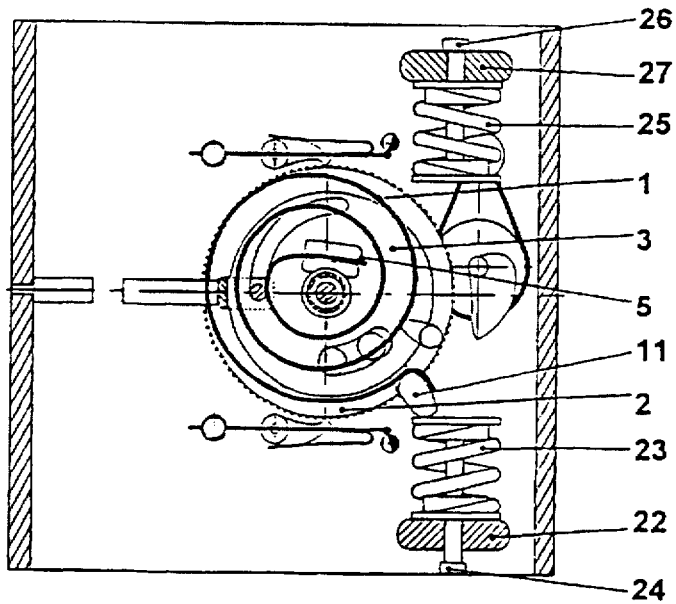
FIG. 19 shows the actuator, wherein the central actuating spring is not used, or is only used in supportive manner, to enable the movement and is substantially designed to supply sufficient pressure of the pin against the stop, and wherein for the outward movement use is made of an additional spring, while an additional spring is also applied for the return movement.
Figure 20:
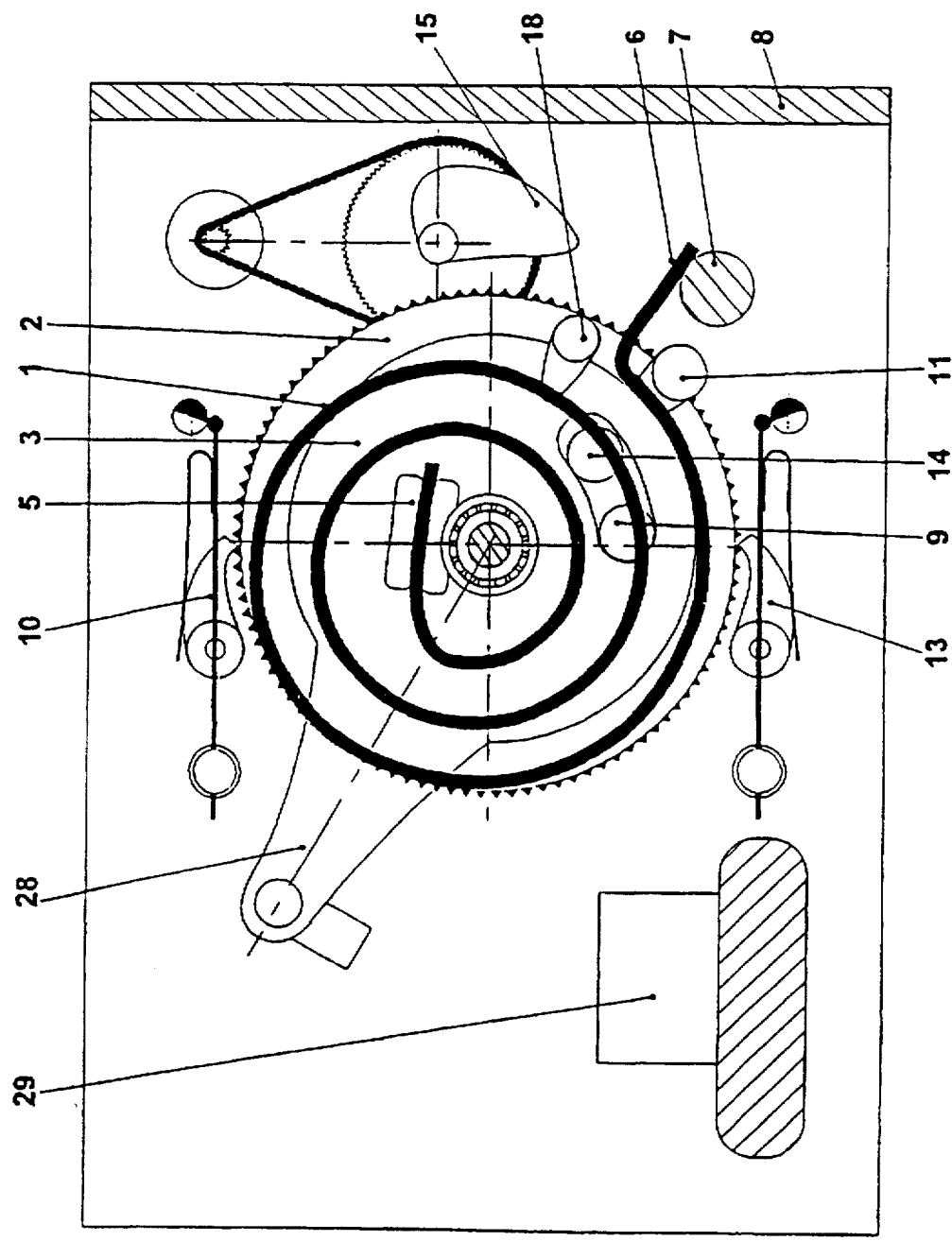
FIG. 20 shows the actuator, wherein a rotating pin is actuated and wherein the actuator is shown in the position prior to the outward movement.

A fourth embodiment relates to the actuator provided with an additional spring 23 for the outward movement and an additional spring 25 for the return movement, wherein spring 1 may or may not be used for support and is used mainly to supply sufficient pressure between pin and stop if this is required (see FIG. 19).

A fifth embodiment relates to the actuator which drives against the stop 29 a rotating pin 28 which can form part of or is connected to the actuating element 3, which stop 29 is connected to frame 8 and wherein the actuator is otherwise constructed in a manner as described above (see FIG. 20).

I claim:

1. An actuator for displacing a movable pin between two end positions, at least one of which two end positions is a stop, comprising at least one energy buffer, components mutually connecting the energy buffer and the movable pin, a mass adapted to store energy of the energy buffer as kinetic energy, wherein at the end of displacement of the mass in at least one direction the kinetic energy of the mass is stored in one energy buffer, locking means which block the actuator in at least one extreme position when the remaining kinetic energy has been substantially transferred to the energy buffer, and means with which energy can be supplied at the end of the movement cycle, wherein between the energy buffer and the movable pin is situated an actuating element which drives the movable pin between two end positions, and the mass which moves along partly parallel with the actuating element, wherein kinetic energy is stored in the mass over a part of the movement, on the basis of which kinetic energy the movement of the actuating element can be completed without other energy sources having to be applied for this purpose and whereof at the end of the movement the mass can rotate further relative to the actuating element, wherein the remaining kinetic energy of the mass is relinquished to the energy buffer.

2. The device as claimed in claim 1, wherein the actuator forms part of a frame in which the energy buffer forms part of an assembly of rotating parts, which energy buffer is adapted to contain sufficient energy for both the outward and return movements and whereof in the starting position, when the energy buffer is fully charged, the one outer end of the energy buffer is fixedly connected to the actuating element and the other outer end supports on a stop of the frame and wherein the rotating mass which is carried along in the movement by the actuating element is provided with a stop such that after a certain angle this stop comes up against that outer end of the energy buffer which supports on the stop of the frame, whereby this stop on the mass takes over the supporting point, whereafter the energy buffer is enclosed between mass and actuating element and generates no further energy, whereafter the actuating element, rotating mass and energy buffer together rotate further until the movable pin, and therewith the actuating element, strikes against its stop, whereafter the rotating mass can rotate further relative to the actuating element, wherein the contact via the collective supporting point is broken, whereby the kinetic energy is converted into potential energy of the energy buffer whereby the rotating mass brakes and comes to a standstill, wherein the energy buffer also exerts a pressure on the stop via the actuating element, whereafter locking means engage and block the actuator, whereafter the return movement can be initiated on the basis of the energy stored in the energy buffer, wherein the movement proceeds with the outward movement wherein the energy buffer first actuates the mass, whereafter by means of the collective supporting point the actuating element is carried along in the movement of the mass.

3. The device as claimed in claim 2, wherein at least one end position of the actuator locking means engage on the mass generally at the moment it comes to a standstill, in the direct vicinity of the outside of the rotating mass so that in simple manner, by choosing a comparatively large diameter of the mass, a sufficiently large peripheral path can be obtained, whereby the inevitable fall-back angle resulting from elasticity, play and inertia of the locking can be kept very small, whereby energy loss as a result of the fall-back remains limited.

4. The device as claimed in claim 2, wherein for contact between mass and actuating element two stops placed one after another are applied which are used sequentially, the first stop of which is used during the outward movement, which stop, at the moment that the mass moves further in relation to the actuating element, is removed from the plane of movement of the mass in relation to the actuating element, whereby the stop located thereafter becomes available for the return movement, thus achieving that the angle through which the energy buffer can slacken is greater than the angle at which the mass generated its kinetic energy to the energy buffer, with the result that a greater return speed can be achieved than without this provision.

5. The device as claimed in claim 1, the actuated pin is associated with the actuating element, wherein the actuated pin is rotatable.

6. The device as claimed in claim 1, wherein the actuated pin is non-rotatable and is connected to the actuating element via a conversion mechanism.

7. The device as claimed in claim 1, wherein the actuator forms part of a frame in which at least two energy buffers are arranged, and wherein both energy buffers contain sufficient energy for both the outward and return movements and wherein the second energy buffer is enclosed between the frame and the assembly of rotating parts and the first energy buffer is arranged between both rotating parts and wherein only the second energy buffer generates energy to the assembly of rotating parts for the outward movement, while at the end of the outward movement the first energy buffer absorbs the remaining kinetic energy as potential energy and together therewith contains sufficient energy for the return movement, wherein the second energy buffer is fixedly connected with the one outer end to the frame and with the other outer end engages on the mass via a stop so that the charged energy buffer, when the locking is released, can generate its energy directly to the assembly of the rotating parts over a certain angle or stroke, whereafter the assembly of rotating parts loses contact with this energy buffer and moves further on the basis of the kinetic energy that is present, whereafter the actuating element, rotating mass and the second energy buffer together rotate further.

8. The device as claimed in claim 7, wherein the first and the second energy buffer are adapted to contain sufficient energy for both the outward and return movements and wherein both energy buffers generate energy for the outward movement to the assembly of rotating parts.

9. The device as claimed in claim 7, wherein only the first energy buffer is adapted to generate energy for the outward movement and wherein the first and the second energy buffer are used to store the remaining kinetic energy at the end of the outward movement and to provide energy to the return movement.

10. The device as claimed in claim 7, wherein in addition to the first energy buffer two extra energy buffers are used, wherein the second energy buffer is deployed for the outward movement and the first and third energy buffer are used for the return movement and wherein the first energy buffer, which forms part of the assembly of rotating parts, mainly ensures the correct pressure between movable pin and stop at the end of the outward movement and wherein the remaining kinetic energy is stored in the first and third energy buffer for the purpose of the return movement.

11. The device as claimed in claim 1, wherein an auxiliary energy buffer is mounted parallel to the rotating parts which carries the rotating parts to a predetermined point in order to give the actuator a defined position in the case that any of the intended end positions is not reached.

12. The device as claimed in claim 1, wherein at least one energy buffer comprises spring means.

13. The device as claimed in claim 1, wherein at least one energy buffer comprises pneumatic means.

14. The device as claimed in claim 1, wherein at least one energy buffer comprises hydraulic means.

15. The device as claimed in claim 1, wherein at least one energy buffer comprises electromagnetic means.

16. The device as claimed in claim 1, wherein at least one energy buffer comprises piezo-ceramic means.

17. The device as claimed in claim 1, wherein the actuator is provided with a device for charging at least one of the energy buffers with energy.

18. The device as claimed in claim 6, wherein the speed of the movable pin relative to the stop can be adjusted by adapting the manner in which the rotating movement is converted into a non-rotating movement when a non-rotatably movable pin is used, or by adapting the actuation angle of the rotatable pin relative to the stop.

* * * * *